(12) United States Patent
Bland (10) Patent No.: US 7,690,203 B2
(45) Date of Patent: Apr. 6, 2010

(54) REMOVABLE DIFFUSION STAGE FOR GAS TURBINE ENGINE FUEL NOZZLE ASSEMBLAGES

(75) Inventor: Robert J. Bland, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 976 days.

(21) Appl. No.: 11/378,025

(22) Filed: Mar. 17, 2006

(65) Prior Publication Data

US 2007/0214790 A1   Sep. 20, 2007

(51) Int. Cl.
F02C 1/00 (2006.01)
F02C 3/00 (2006.01)
(52) U.S. Cl. .............................. 60/737; 60/740; 60/742
(58) Field of Classification Search .................. 60/737, 60/740, 742
See application file for complete search history.

(56) References Cited

U.S. PATENT DOCUMENTS

| 5,274,991 | A | | 1/1994 | Fitts |
| 5,850,732 | A | * | 12/1998 | Willis et al. ................... 60/804 |
| 5,987,875 | A | * | 11/1999 | Hilburn et al. ................ 60/775 |
| 6,532,726 | B2 | | 3/2003 | Norster et al. |
| 6,698,207 | B1 | * | 3/2004 | Wiebe et al. .................. 60/737 |
| 6,786,046 | B2 | | 9/2004 | Wiebe et al. |
| 2004/0045273 | A1 | | 3/2004 | Bland |

OTHER PUBLICATIONS

GE Power Systems, "Dry Low $No_x$ combustion Systems for GE Heavy-Duty Gas Turbines", Publication No. GER-3568G, pp. 4, 10, 15 & 17, Oct. 2000.
GE Power Systems, Publication No. GER-3434D, p. 8.

* cited by examiner

Primary Examiner—Michael Cuff
Assistant Examiner—Craig Kim (57) ABSTRACT

A gas turbine engine fuel nozzle assemblage (10) comprises a nozzle outer body (25) comprising a premixing section (23) and an interiorly disposed first fuel passageway (22) to supply fuel to the premixing section (23), and more interiorly a central channel (33) comprising an inlet (30) from an air supply, an aperture (19) at an upstream end to receive a lance (18), and a downstream-disposed annular bearing surface (21) adapted to slidingly engage the lance, the fuel nozzle assemblage adapted so that the lance may be alternatably selected as any interchangeable one of a gas lance, an oil lance, and a non-fueling dummy lance. Between the lance and the central channel (33) is formed a cooling fluid passageway (24) that is in fluid communication with the inlet (30) and one or more cooling fluid passageway exits (60). The interchangeability of the lances (18) is effective to provide a desired flexible functionality to said fuel nozzle assemblage. The architecture of the fuel nozzle assemblage (10) may be utilized for higher level architectures of benefit to gas turbine engine facilities.

14 Claims, 6 Drawing Sheets

REMOVABLE DIFFUSION STAGE FOR GAS TURBINE ENGINE FUEL NOZZLE ASSEMBLAGES

FIELD OF THE INVENTION

The invention relates generally to the field of fuel nozzles adapted for use in gas turbine engines, and more particularly to gas turbine engine fuel nozzle assemblies adapted to receive removable lances, particularly a gas lance.

BACKGROUND OF THE INVENTION

Gas turbine engines are known to include a compressor for compressing air, a combustor for producing a hot gas by burning fuel in the presence of the compressed air produced by the compressor, and a turbine for expanding the hot gas to extract shaft power. The combustion process in many older gas turbine engines is dominated by diffusion type nozzles producing flames burning at or near stoichiometric conditions with flame temperatures exceeding 3,000° F. Such combustion will produce a high level of oxides of nitrogen (NOx). Current emissions regulations have greatly reduced the allowable levels of NOx emissions. Lean premix type combustion has been developed to reduce the peak flame temperatures and to correspondingly reduce the production of NOx in gas turbine engines. In a premixed combustion process, fuel and air are premixed in a premixing section of the combustor. The fuel-air mixture is then introduced into a combustion chamber where it is burned. U.S. Pat. No. 6,082,111 describes a gas turbine engine utilizing a can annular premix combustor design. Multiple premix-type nozzle assemblies are positioned in a ring to provide a premixed fuel/air mixture to a combustion chamber. A diffusion type pilot fuel nozzle assembly is located at the center of the ring to provide a flow of pilot fuel to the combustion chamber.

The design of a gas turbine combustor is complicated by the necessity for the gas turbine engine to operate reliably with a low level of emissions at a variety of power levels and during a variety of operating sequences. High power operation at high firing temperatures tends to increase the generation of oxides of nitrogen. Low power operation at lower combustion temperatures tends to increase the generation of carbon monoxide and unburned hydrocarbons due to incomplete combustion of the fuel. Under all operating conditions and sequences, it is important to ensure the stability of the flame to avoid unexpected flameout, damaging levels of acoustic vibration, and damaging flashback of the flame from the combustion chamber into the fuel premix section of the combustor. A relatively rich fuel/air mixture, such as provided by a diffusion type nozzle, will improve the stability of the combustion process but will have an adverse affect on the level of emissions. A diffusion type nozzle may be especially useful to maintain flame stability during operations in which a rapid decrease in fueling is effectuated. In view of these emissions concerns and operations considerations, a careful balance must be achieved among these various constraints in order to provide a reliable machine capable of satisfying very strict modern emissions regulations.

Whereas older pilot nozzle assemblies often were diffusion type nozzles, newer styles include premix capability. Some such newer nozzle assemblies may additionally comprise a diffusion capability, but with that dual capability comes a higher initial cost and subsequent durability issues, such as due to the presence of baffles or other features that address thermal expansion issues among the components. Such greater complexity, in addition to increasing initial cost, may lead to less overall reliability. Other such newer nozzle assemblies may have a lower initial cost but may not provide diffusion capability, nor an interchangeable (with regard to fuel type and function) diffusion capability. The present invention advances the art by addressing these concerns.

BRIEF DESCRIPTION OF THE DRAWINGS

The invention is explained in following description in view of the drawings that show.

DETAILED DESCRIPTION OF THE INVENTION

The inventor of the present invention has advanced the art by identifying nozzle assembly solutions flowing from a search to find more effective ways to utilize an inexpensive fuel nozzle construction approach. In part these solutions are based on identifying that such inexpensively constructed nozzle assembly may be modified to include a novel gas lance in a central passageway. This in turn has led both to specific and to more general applications for such thereby-modified nozzle assembly in gas turbine engines. For example, by providing a nozzle outer body adapted to receive the gas lance, an inexpensive and reliable two stage nozzle assemblage results. Further, by combining that nozzle outer body with such gas lance and selectively with other similarly sized lances, the present invention also comprises novel nozzle systems that provide a plurality of nozzle assemblages comprising interchangeable lances. This provides for greater component commonality for a gas turbine facility, and may consequently reduce parts inventory and related costs. Accordingly, in identifying such solution, the present invention advances the general art of nozzles assemblies and combustors for and in gas turbine engines.

In some embodiments of the present invention, a two-stage nozzle assemblage is provided that comprises a thermally decoupled center-positioned, removable gas lance. A center-positioned gas lance that operates in diffusion mode comprises one stage. The other stage is a premixing nozzle section positioned about the gas lance yet thermally decoupled from it. It is noted that by gas lance is meant a removable structure, insertable into a nozzle outer body, that conveys a gaseous fuel through its outlet end for combustion in the combustor. Also, as used herein, by thermally decoupled is meant that certain components, here one being the lance, are decoupled mechanically to allow for differential axial thermal growth.

Other embodiments of the present invention provide a flexible-use fuel nozzle assemblage in which a nozzle outer body may be alternatively and sequentially fitted with a gas lance, an oil lance, or a non-fueling dummy lance in the central passageway. By virtue of this flexibility and interchangeability, a plurality of appropriately combined nozzle assemblages and/or nozzle components may be supplied to a gas turbine engine facility to simplify inventory, installation, and reliability problems associated with having different nozzles and different nozzle assemblies for gas turbine engines. Such differences, which may be based on fuel type and/or position and role of a fuel nozzle (i.e., pilot vs. main nozzle), are accommodated by combinations of the nozzle outer body and interchangeable lances as described herein.

It is appreciated that the trend toward lower emissions has brought about a number of different approaches to fuel mixing and gas turbine engine operations. For example, U.S. Pat. No. 6,786,046 teaches a dual-mode approach, wherein a fuel nozzle assembly comprises a peripheral, radially disposed premixing section combined with a more central oil diffusion nozzle. In such embodiment, a differential thermal expansion between the two fuel supplies to these stages is accounted for by the use of internal bellows. Such bellows adds to the expense of such designs. Also, it is expected that this component may detract from durability, leading to concerns about reliability.

In contrast, U.S. Pat. No. 6,698,207 teaches a single mode, flame holding nozzle that provides passive tip cooling and controlled fuel dispersion. Advantageously, a cooling air flow passes through a channel adjacent a fuel supply channel, and is free of fuel contamination. A more interior, central passageway may comprise an igniter, may be plugged, or may be adapted to transmit a fluid. This arrangement of elements eliminates the need for complex valve arrangements or bellows, thereby reducing costs and increasing expected reliability. The flame holding nozzle of this patent is taught as being either a peripheral premix type or a diffusion type. The latter comprises cooling air exits and fuel exit apertures disposed at a downstream end radially outward of the inner, central passageway. This and all other patents, patent applications, patent publications, and other publications referenced herein are hereby incorporated by reference in this application in order to more fully describe the state of the art to which the present invention pertains, to provide such teachings as are generally known to those skilled in the art, and to provide specific teachings as may be noted herein.

The present invention modifies the fuel nozzle construction approach taken in U.S. Pat. No. 6,698,207 so as to provide a dual-fuel nozzle assembly that comprises, in various embodiments, a central gas fuel lance. Examples of embodiments of this, and of more general solutions flowing from such adaptation, are provided in the following description and the associated accompanying drawings. It is to be understood, however, that the drawings are designed solely for purposes of illustration of particular embodiments and not as a definition of the limits of the invention. It should be further understood that the drawings are not necessarily drawn to scale and that, unless otherwise indicated, they are merely intended to conceptually illustrate the structures and methods described herein. Likewise, the following descriptions of specific embodiments are not to be taken as limiting the scope of the claims.

Figure 1:
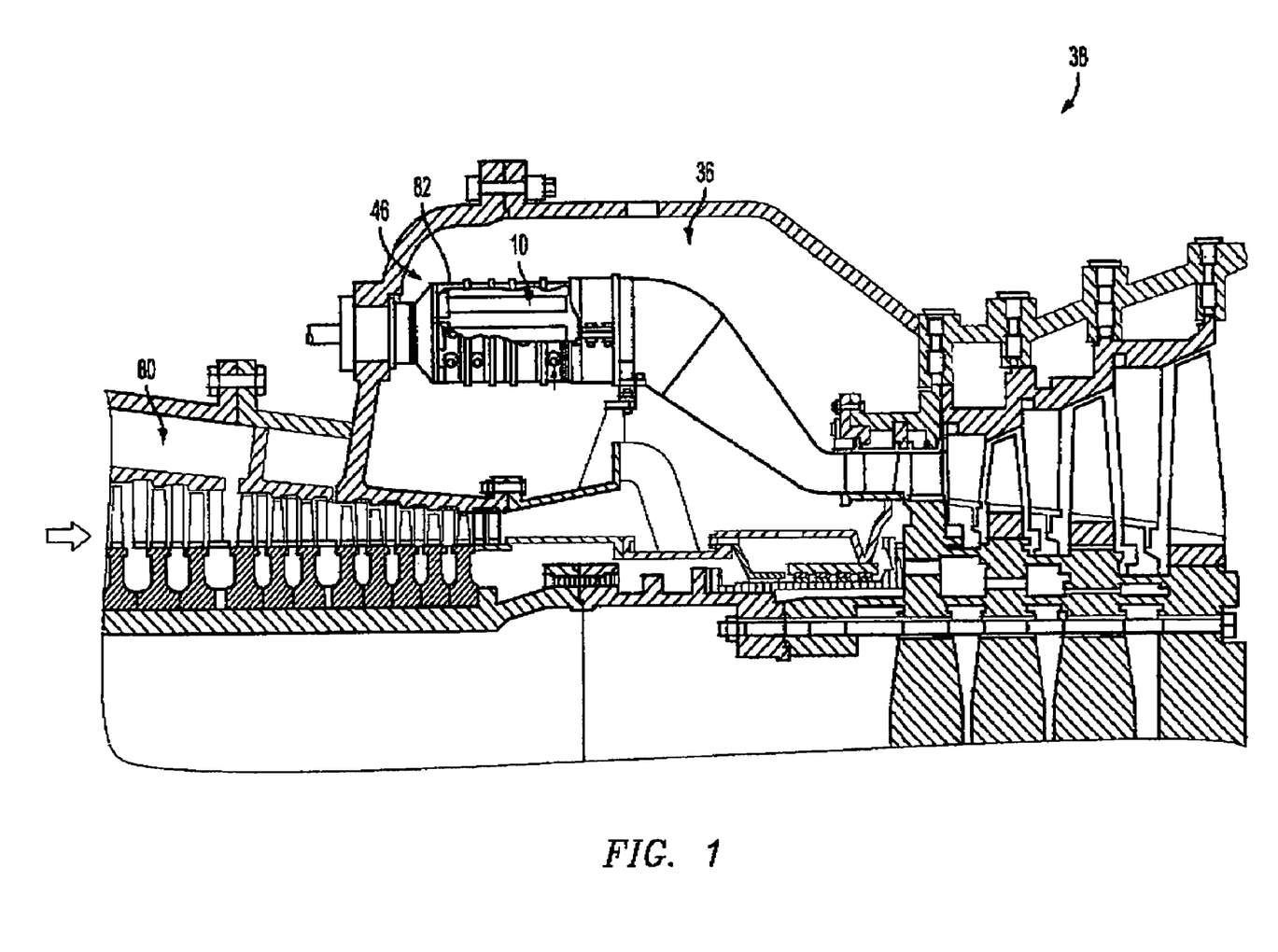
FIG. 1 is a side elevation of a combustion engine employing the nozzle of the present invention.
Figure 2:
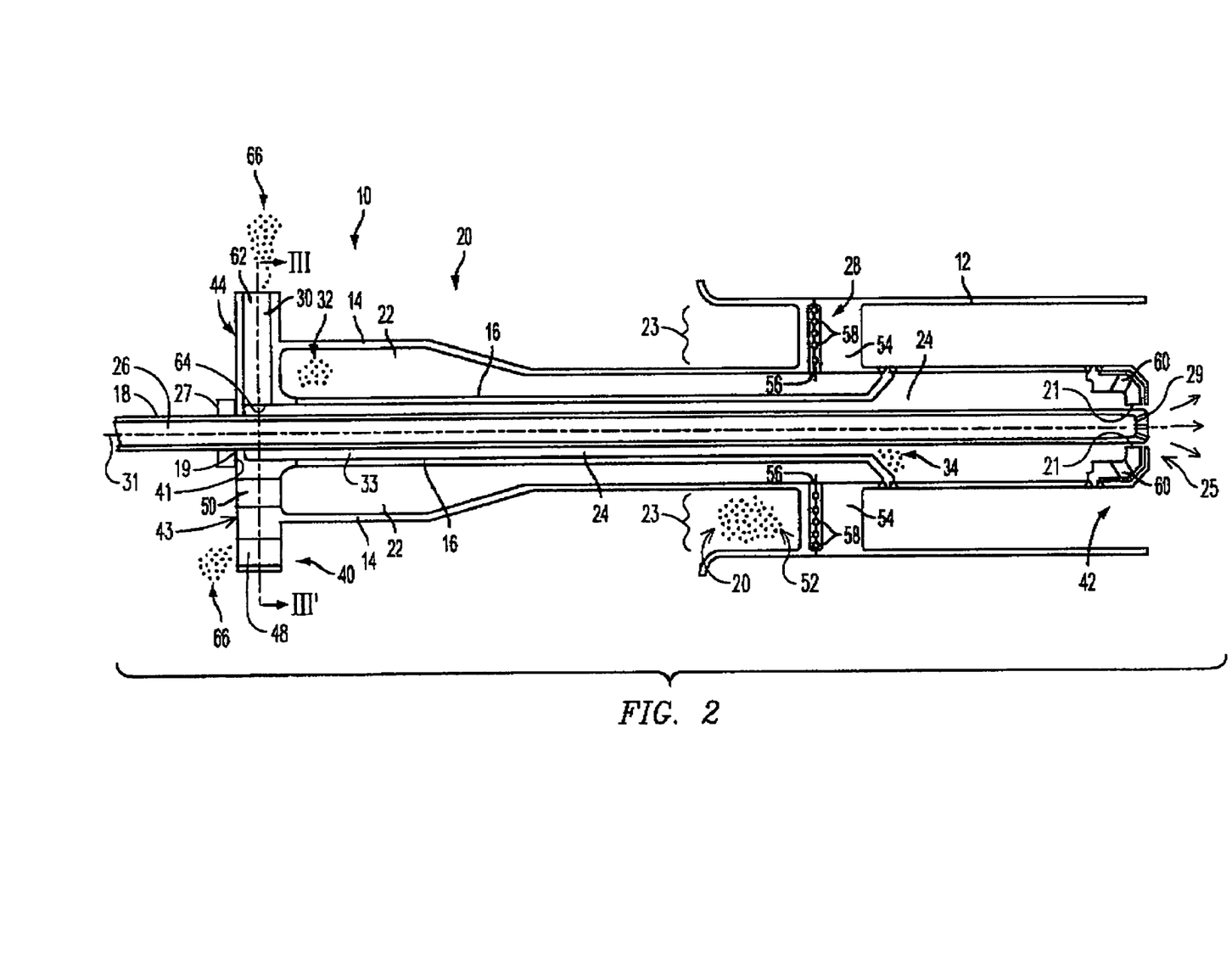
FIG. 2 is a side sectional view of one embodiment of a nozzle assemblage of the present invention.

Reference is now made in general to the FIGS. 1 to 5, wherein one embodiment of a nozzle assemblage 10 of the present invention is shown. As shown in FIG. 1, the nozzle assemblage 10 of the present invention is especially suited for use in a combustion system 36 using nozzles that operate in a dual-mode as described herein. Further, combustion system 36 may be provided with nozzles as described herein that provide for interchangeable center lances. By way of overview, and with additional reference to FIG. 2, the nozzle assemblage 10 resembles an elongated cylinder having several substantially-concentric tube-like sleeves comprising an outer wall 12, a first sleeve 14 and a second sleeve 16. These cooperatively form a collection of annular passageways 20, 22, and 24, further defined herein, which facilitate controlled flow of certain fluids through the nozzle. The nozzle assemblage 10 is characterized by a first, upstream end 40 and an opposite second, downstream end 42, with fluids flowing generally from the first end to the second end during operation. Also depicted in FIG. 2 is a centrally disposed gas lance 18 that slidably engages a first aperture 19 at the first end 40 and that additionally slidably engages an annular bearing surface 21 near the second end 42. The first aperture 19 and the annular bearing surface 21 are in a linear alignment along longitudinal axis 31. The nozzle assemblage 10 also includes conduit group 28 that advantageously allows a first fuel 32 to reach designated exit holes 58 that supply the first fuel 32 into a premix nozzle section, generally depicted as 23. The nozzle assemblage 10 also comprises conduit group 30 that advantageously allows tip cooling air 34 to reach a designated cooling fluid passageway 24 within the nozzle. More particularly, the first conduit group 28 allows first fuel 32 to move from premix passageway 22 into the premix passageway 20 to interact with premix air 52 located therein. Such interaction results in premixing of the first fuel and air passing through annular chamber 20. The second conduit group 30 beneficially allows tip cooling air 34 to reach cooling air passageway 24 from a location radially outward of the fuel-containing premix passageway 22, without allowing the first fuel 32 to contaminate the tip cooling air 34. Cooling fluid passageway exits 60 allow tip cooling air 34 to leave the cooling fluid passageway 24 and cool the nozzle second end 42.

The nozzle assemblage 10 of the present invention as depicted in FIG. 2 may be considered to comprise a nozzle outer body 25, comprising all elements depicted in FIG. 2 except for the central gas channel 26, and the gas lance 18. This is because the gas lance 18 is slidably engageable and adaptable to be inserted, affixed to, and removed from the nozzle outer body 25. More particularly, for example, gas lance 18 comprises a flange 27 adapted to engage a portion 41 of the outer surface 43 of mounting flange 44. Attachment, such as by bolts (not shown), may be made here, or preferably onto a more substantial upstream structure (not shown) of combustion system 36, so as to stably secure the gas lance 18. Following such attachment, air passage from cooling fluid passageway 24 through the first aperture 19 is reduced or eliminated. Also, appropriate connections, as known by those skilled in the art, are made to connect the lance to a supply of fuel (not shown). Openings 29 at the downstream end of gas lance 18 release gas (shown by arrows) during operation, providing a diffusion type flame.

Accordingly, and taking a more generalized view of features of FIG. 2, it may be appreciated that the nozzle outer body 25 is a subcomponent of a gas turbine engine fuel nozzle assemblage and comprises a first fuel passageway 22 adapted to provide fuel from a source to a premixing section 23, and a more inward disposed central channel 33 adapted to receive a gas lance, such as by being defined by an upstream-disposed aperture adapted to receive the gas lance 18 (or a non-fueling dummy lance), and a downstream-disposed annular bearing surface adapted to slidably engage the gas lance (or a non-fueling dummy lance). Advantageously, when such lance 18 is inserted as provided herein, a cooling fluid passageway 24 is formed between this insertable piece and the more interior tube of the nozzle outer body 25.

Thus, some embodiments of the present invention comprise such nozzle outer body in association with a gas lance, with an oil lance, or with a non-fueling dummy lance, as described herein. Such combinations comprise nozzle assemblages. Other embodiments comprise either of these as components of combustors and gas turbine engines. Gas lances, oil lances, and non-fueling dummy lances adapted to fit a nozzle outer body of the present invention also comprise embodiments of the present invention.

Further to specific operational and structural features of the embodiment depicted in FIG. 2, the first fuel 32 travels from a source of fuel (not shown) through apertures 50 at the upstream end 40 of the nozzle assemblage 10 and enters the premix passageway 22. The first fuel 32 then enters into the premix passageway 20, to interact with premix air 52 located therein. By so interacting the first fuel 32 forms a flammable mixture with the premix air 52 located therein. The flammable mixture flows toward the nozzle second end 42; combustion may be initiated by a standing flame provided by the diffusion type gas lance 18. Tip cooling air 34 passes through the cooling fluid passageway 24 and prevents tip melting, as described in greater detail below.

Figure 3:
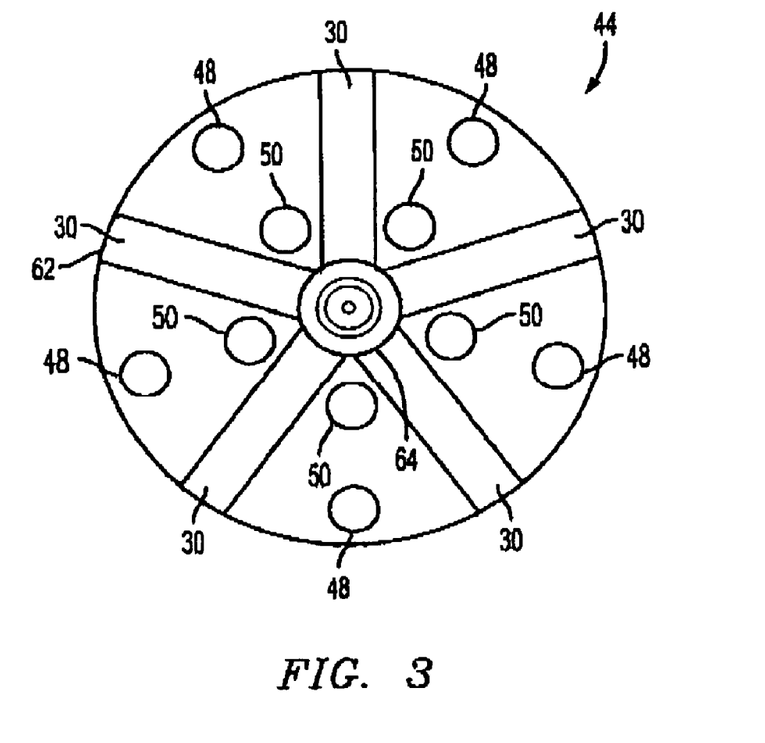
FIG. 3 is an end view of the mounting flange shown in FIG. 2, taken along cutting line III-III.

With particular reference to FIGS. 2 and 3, the nozzle assemblage 10 includes a mounting flange 44 that helps secure the nozzle within a combustor 46 of a selected gas turbine combustion system 36. The mounting flange 44 includes two groups of apertures 48, 50 that allow premix air 52 and first fuel 32, respectively, to pass through the flange 44 and enter corresponding passageways, or chambers, formed by the first and second sleeves 14 and 16. More particularly, the first set of apertures 48 facilitates entry of premix air 52 into the premix passageway 20. Similarly, the second set of apertures 50 allows first fuel 32 to enter the premix passageway 22.

Figure 5:
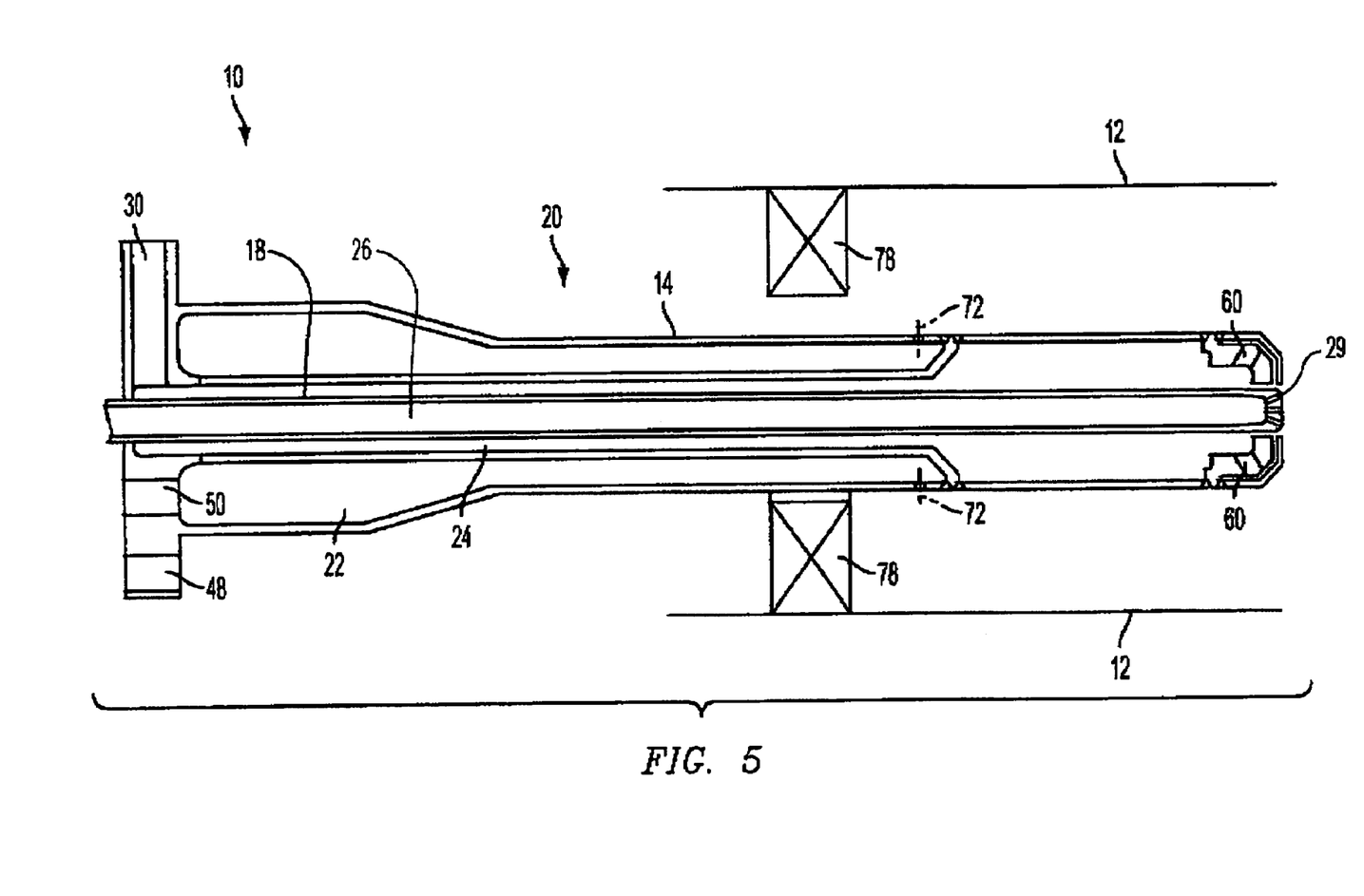
FIG. 5 is a side sectional view of the nozzle assemblage shown in FIG. 2 having alternate flow conditioning elements.

With continued reference to FIGS. 2 and 3, conduits 28, 30 beneficially allow first fuel 32 and tip cooling air 34, respectively, to flow between portions of the nozzle assemblage 10 without becoming commingled. The first group of conduits 28 includes fuel injection members 54 that are each characterized by an entrance 56 in fluid communication with the first fuel passageway 22 and an exit 58 in fluid communication with the premix air passageway 20. With continued reference to FIG. 2, the fuel injection members 54 are hollow and include a group of exit holes 58. With this arrangement, the fuel injection members 54 transmit first fuel 32 into the premix air passageway 20, where it mixes with premix air 52 and creates a flammable mixture of fuel and air. The fuel injection members 54 may be adapted to condition flow within the premix air passageway 20 by, for example, having a substantially-airfoil-shaped cross-section. As seen in FIG. 5, other flow conditioning elements, such as discrete swirler vanes 78, or other suitable components, may also be provided as desired. As depicted in FIG. 5, the flow conditioning elements 78 may be connected to either or both of the nozzle first sleeve 14 and/or to a nozzle outer wall 12.

It is noted that the first set of conduits 28 need not include fuel injection members 54, and may take a variety of forms that permit fuel to travel from the first fuel passageway 22 to the premix passageway 20. For example, as shown in FIG. 5, simple exit apertures 72 disposed within the first sleeve 14 may be used. It is further noted that the first fuel 32 may exit the first fuel passageway 22 from a variety of axially-different locations. For example, first fuel 32 may exit along portions of flow conditioning members such as swirlers (not shown). It is also noted that the outer wall 12 is not required for operation; the premix air passageway 20 may be bounded by the first sleeve 14 and a supplemental sleeve or partition, such as the combustor wall 82 or other suitable boundary, as seen in FIG. 1.

As noted above, the second group of conduits 30 provide dedicated paths through which tip cooling air 34 reaches the cooling fluid passageway 24. As will be described in more detail below, the tip cooling air 34 in the cooling fluid passageway 24 flows downstream and through cooling fluid passageway exits 60 to cool the nozzle tip at second end 42.

Each of the conduits 30 in the second conduit group includes an entrance 62 in fluid communication with a source of tip cooling air 34 (such as a compressor 80 coupled with the associated combustion turbine engine 38, seen in FIG. 1) and an opposite exit 64 in fluid communication with the cooling fluid passageway 24. In one embodiment, the second conduit entrances 62 are in fluid communication with compressor discharge air 66, and the second group of conduits 30 directs a portion of the compressor discharge air into the cooling fluid passageway 24 to, as noted above, cool the nozzle second end 42.

With particular reference to FIG. 3, each of the conduits 30 is oriented radially within the mounting flange 44. With continued reference to FIG. 3, the cooling fluid conduits 30 lie between the premix air and fuel apertures 48, 50, which extend longitudinally through the mounting flange 44. In keeping with the objects of the invention, this arrangement advantageously allows the entrances 62 of the cooling fluid conduits 30 to be located radially-outboard of the first fuel 32 and the cooling fluid conduit exits 64 to be located radially-inboard of the first fuel 32. As a result, the cooling fluid conduit entrances 62 are located upstream of the locations where first fuel 32 joins the compressor discharge air 66. This arrangement advantageously allows one source of air 66 to provide air for several purposes, while safely ensuring that the tip cooling air 34 used for cooling is fuel-free and not flammable.

As seen in FIG. 2, an annular bearing surface 21 permits relative motion at the second end of the nozzle 42, thereby accommodating thermal growth differences during operation. With this arrangement, tip cooling air 34, and not fuel, flows within cooling fluid passageway 24. This advantageously ensures that fluid which may emanate between the annular bearing surface 21 and a lance (such as gas lance 18 in FIG. 2) is not flammable. In addition, any small amount of cooling tip air 34 that may emanate through such interface during operation may advantageously supply a cooling effect at the tip directly adjacent the lance.

Figure 4:
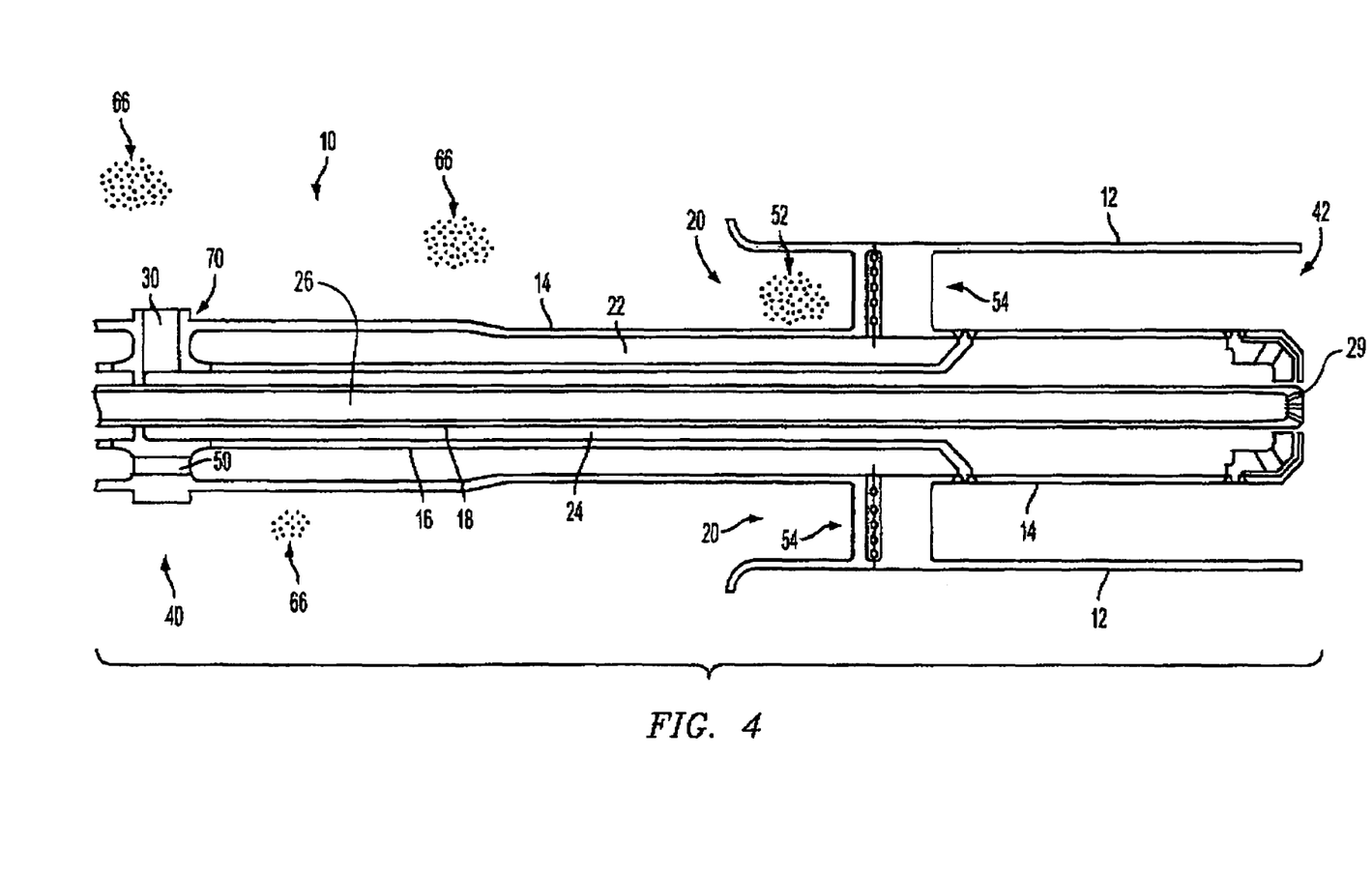
FIG. 4 is a side sectional view of the nozzle assemblage shown in FIG. 2, having an alternate cooling fluid transfer arrangement.

It is noted that the cooling fluid conduits 30 need not be radially arranged; any suitable orientation that allows the tip cooling air 34 to enter the cooling fluid passageway 24 from a location upstream of the first fuel 32 would suffice. Radial arrangement of the cooling fluid conduits 30 does, however, provide enhanced manufacturability. It is also noted that the cooling fluid conduits 30 need not be located in a mounting flange 44; other locations may be used as desired. For example, as shown in FIG. 4, the second group of conduits 30 may extend through a component that does not support the nozzle assemblage 10, such as a fluid supply ring or hub 70. It is also noted that compressor discharge air 66 substantially surrounds the nozzle first end 40, and that such air may enter the premix air passageway 20 by travelling around the nozzle first end and flowing between the outer wall 12 and first sleeve 14, thereby eliminating the need for the first group of apertures 48.

With continued reference to FIG. 2, the cooling fluid passageway exits 60 are in fluid communication with the premix air passageway 20, and a pressure drop across the premix air passageway 20 helps move the flow of tip cooling air 34 through the cooling fluid passageway 24/exit 60. The pressure drop in the premix air passageway 20 may be increased through, among other methods, increasing turbulence and/or velocity in the premix air passageway 20. With this arrangement, the nozzle assemblage 10 of the present invention provides a passive tip cooling system that employs a dedicated, air-only cooling fluid which eliminates the need for flows of purge fluid or fuel-blocking members.

It is noted that while the nozzle assemblage 10 of the present invention has been described as diverting a portion of the compressor discharge air 66 into the cooling fluid passageway 24 to provide tip cooling air 34, other arrangements may be used. For example, the entrances 62 of the cooling fluid conduits 30 may be in fluid connection with other sources of tip cooling air, including a cooling air manifold (not shown). It is also noted that tip cooling air 34 may be motivated through the cooling fluid passageway 24 by a pump (not shown) or other suitable flow-inducing components.

During operation, the first and second sleeves 14, 16 are each exposed to compressor discharge air 66 and first fuel 32. As a result, the thermal expansion exhibited by the first sleeve 14 is substantially, if not identically, the same as the thermal expansion exhibited by the second sleeve 16. With this arrangement, the first sleeve 14 may advantageously be connected to the second sleeve 16 in a rigid manner, thus eliminating the need for flexible connections, such as bellows, or slip-fit arrangements. This advantageously makes the nozzle assemblage 10 more reliable, increases the nozzle life span, and makes the nozzle less likely to leak.

In one specific embodiment, the first fuel 32 is gas, and gas also supplies the central gas lance 18. This provides a nozzle assemblage that has relative structural simplicity, is relatively low cost, and is useful during gas turbine operations for ignition and for acceleration to middle range loads. This specific assemblage finds particular utility when positioned centrally and functioning as a two stage pilot nozzle.

The above disclosure and related drawings teach specifics and discuss variations of a single nozzle assembly that comprises a gas lance fit into a nozzle outer body. It is appreciated that a nozzle outer body, such as the nozzle outer body 25 discussed above, may receive any interchangeable one of an oil lance, a gas lance, or a non-fueling dummy lance through an aperture adapted to receive such lance. This provides a nozzle architecture that enables, for one or more gas turbine engines, use of a plurality of identical nozzle outer bodies, fitting each of the plurality with a lance that is suited for the position, mode, staging, and operational objectives of that nozzle assembly.

Figure 6A:
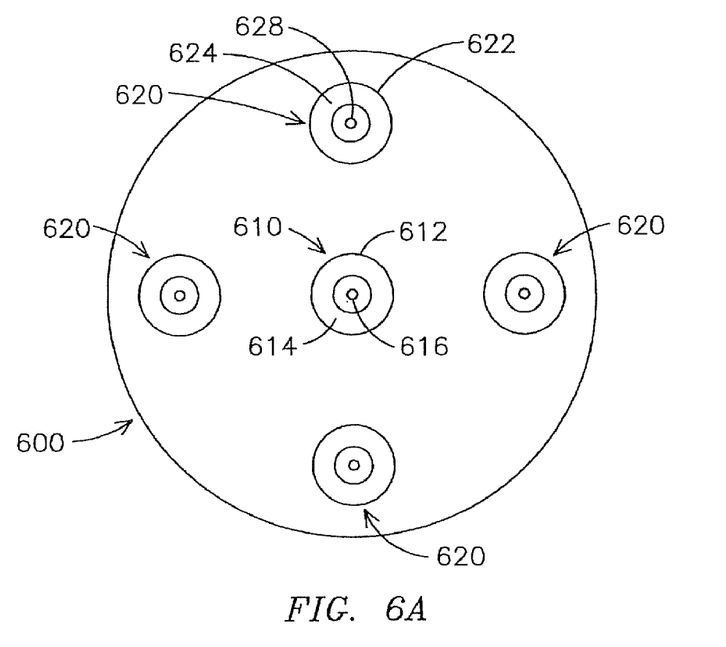
FIG. 6A provides a first schematic cross-sectional representation of a single can-annular combustor comprising a central pilot nozzle assembly and four peripheral main nozzle assemblies.

To illustrate the potential of this architecture, FIG. 6A provides a first schematic cross-sectional representation of a single can-annular combustor 600 comprising a central pilot nozzle assembly 610 and four peripheral main nozzle assemblies 620. The central pilot nozzle assembly 610 comprises a nozzle outer body 612 that comprises a premix stage 614, and a central gas lance 616. Each of the four main nozzle assemblies 620 comprises a nozzle outer body 622 that comprises a premix stage 624, and a central non-fueling dummy lance 628. The nozzle outer body 612 is identical in construction and dimension with the four nozzle outer bodies 622. Each of these nozzle assemblies 610 and 620 comprise embodiments of the nozzle assemblies of the present invention, as is described above and claimed herein.

When so configured, the can-annular combustor 600 operates with a relatively efficient and robust pilot nozzle assembly 610 in which the premix stage 614 provides relatively low emission piloting functions during various operations, and the central gas lance 616 also provides for stable piloting during these and/or other operations. For example, not to be limiting, during substantial turn-down operations, operating the central gas lance 616 may sustain the flame and avoid flameout and undesired shut-down whereas the premix stage 614 may not have so sustained the flame under such condition As one example of a possible staging strategy for this design, which is not meant to be limiting, the following table of a staging strategy is provided:

TABLE 1

Exemplary Staging Strategy

| Operation Modes: | Stages that are operational: |
|---|---|
| Ignition and acceleration | Center diffusion and premix stages |
| Full Speed/No Load | Center diffusion and premix plus half outer radial premix nozzles |
| Mid load and above | All stages (low flow to diffusion pilot) |

Figure 6B:
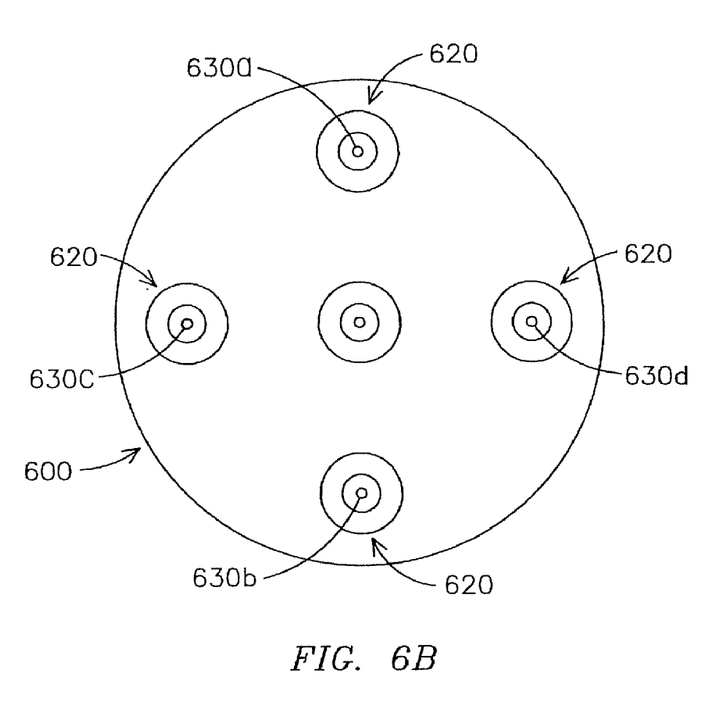
FIG. 6B provides a second schematic cross-sectional representation of a single can-annular combustor comprising a central pilot nozzle assembly and four peripheral main nozzle assemblies.

FIG. 6B provides a second schematic cross-sectional representation of the single can-annular combustor 600 of FIG. 6B, however, now comprising different lances in the four peripheral main nozzle assemblies 620. Specifically, instead of the four non-fueling dummy lances (i.e., 628 in FIG. 6A), each of the four main nozzle assemblies 620 comprises an oil lance 630a-d. As for FIG. 6A, each of these nozzle assemblies 610 and 620 comprise embodiments of the nozzle assemblies of the present invention, as is described above and claimed herein, and the like-identified components correspond to components described in FIG. 6A. Depending on the staging regime, two of the oil lances 630a,b may be paired as one stage, while the other two oil lances 630c,d represent a different stage. Alternatively, all four oil lances 630a-d may be one stage of a multi-stage fueling system.

As for FIG. 6A, when so configured the can-annular combustor 600 operates with a relatively efficient and robust pilot nozzle assembly 610 in which the premix stage 614 provides relatively low emission piloting functions during various operations, and the central gas lance 616 also provides for stable piloting during these and/or other operations. In addition, as needed, the four oil lances 630a-d may be operated as needed during specific operations. More specifically, these may be utilized when gas fuel supplies at a particular facility are in relatively short supply, and when oil fuel availability and/or price is more favorable for oil consumption.

Although the above discussion illustrates all the nozzle outer bodies 612 and 622 being identical in construction and dimension, it is appreciated that embodiments of the present invention include nozzle bodies, nozzle assemblages, and nozzle systems in which outer bodies may comprise certain differences (e.g., features of premix conditioning elements) but all have the same interior features that provide for the insertion of any of the interchangeable lances. These interior features include the first, upstream aperture into which a lance may be inserted, and the annular bearing surface. Also, although a standard lance length and passageway length may be utilized for some embodiments, other systems embodiments may provide uniform upstream aperture and annular bearing surface inside diameters among nozzle outer bodies that nonetheless have different distances between these two components. In such latter embodiments, there may be two or more different sets of lance length and corresponding passageway length. For example, a pilot nozzle outer body may comprise a smaller diameter premix nozzle section yet be longer in total length than the nozzle outer bodies of surrounding main nozzle assemblies. A gas lance fitting into this pilot nozzle outer body would have a relatively longer length than the lances of the main nozzle assemblies, yet all nozzle outer bodies would have the same upstream aperture and annular bearing surface inside diameters.

The architecture described above provides for a modular combustor system that may provide increased part commonality, which additionally may result in reduction of inventory at a power plant. Further to this architecture, embodiments of the present invention may be utilized in modular combustor assemblies in which a plurality of nozzle assemblages are attached to a single structure of a combustor. This provides a higher level architecture based on applying to larger systems multiples of the architecture of a nozzle outer body that provides for interchangeable use of any one of a gas lance, and oil lance, and a non-fueling dummy lance, with one of these lances.

One example of a modular combustor assembly is provided in U.S. Pat. No. 5,987,875, which is incorporated by reference for its teachings of nozzle assemblies configured into a nozzle block. A plurality of nozzle assemblages as described herein may be attached to such nozzle block, wherein the nozzle block comprises a plurality of passages between its outer surface and its inner surface, the passages aligned with the apertures of a corresponding plurality of nozzle outer bodies so that any interchangeable one of an oil lance, a gas diffusion lance, or a non-fueling dummy lance may be inserted through a corresponding one of said plurality of passages, and then secured and attached to appropriate fuel supplies for operation. While not meant to be limiting, in such embodiments, the access for change-out of the lances is exterior to the combustion chamber, so disassembly of the combustion chamber (e.g., the nozzle block from the combustor) is not required to change from a nozzle pattern for one fuel or operational program to a nozzle pattern for a second fuel or operational program. This provides for facile change-out of lances as fuel conditions and operating parameters are changed.

With regard to such embodiments, and more generally with regard to other embodiments of the invention, it is appreciated that the descriptions of flanges of the nozzle outer body, and of arrangements of conduits therein, are not meant to be limiting. Any of a number of designs of flanges and arrangements of passages of fluids therein may be adopted for various embodiments, without departing from the scope of the invention as described in the claims below.

More generally, it is to be understood that while certain forms of the invention have been illustrated and described, it is not to be limited to the specific forms or arrangement of parts herein described and shown. It will be apparent to those skilled in the art that various, including modifications, rearrangements and substitutions, may be made without departing from the scope of this invention and the invention is not to be considered limited to what is shown in the drawings and described in the specification. The scope if the invention is defined by the claims appended hereto.

I claim as my invention:

1. A gas turbine engine fuel nozzle assemblage comprising:
a nozzle outer body comprising a premixing section and an interiorly disposed first fuel passageway to supply fuel to said premixing section, and more interiorly a central channel comprising an inlet from an air supply, an aperture at an upstream end to removeably receive an interchangeable lance, and a downstream-disposed annular bearing surface adapted to slidingly engage the interchangeable lance,
wherein said interchangeable lance is one of a gas lance, and an oil lance, wherein said interchangeable lance comprises a lance flange disposed proximate an interchangeable lance upstream end, wherein the interchangeable lance is removeably affixed proximate said aperture via the lance flange, and wherein said interchangeable lance within said central channel forms a cooling passageway, and said interchangeable lance is effective to provide a desired flexible functionality to said fuel nozzle assemblage.

2. The fuel nozzle assemblage of claim 1, wherein a fit between the interchangeable lance and the annular bearing surface thermally decouples the interchangeable lance from the nozzle outer body.

3. The fuel nozzle assemblage of claim 1, wherein the interchangeable lance is a gas lance.

4. A gas lance adapted for the fuel nozzle assemblage of claim 1.

5. A gas turbine engine nozzle assemblage comprising:
a nozzle cuter body having an upstream end and a downstream end, comprising a radially disposed premixing section adapted to receive a first fuel through a first fuel passageway in the nozzle outer body, the nozzle outer body additionally comprising a first aperture at the upstream end and an annular bearing surface at the downstream end, wherein a removable and interchangeable lance inserted into the first aperture so as to contact the annular bearing surface defines an interior annular wall for a cooling fluid passageway for passage of tip cooling air; and
said lance being one of a gas lance, and an oil lance, wherein said lance comprises a lance flange proximate a lance upstream end, wherein the lance is removeably fastened proximate the nozzle outer body upstream end via the lance flange.

6. A gas turbine engine combustor comprising a plurality of the nozzle assemblages of claim 5.

7. A gas turbine engine comprising a plurality of the nozzle assemblages of claim 5.

8. A gas turbine engine combustor architecture comprising:
a nuzzle block comprising an outer surface, an inner surface disposed toward a combustor chamber space, and a plurality of passages between the outer surface and the inner surface aligned with a corresponding plurality of nozzle outer bodies, each said nozzle outer body extending into the combustor chamber space from the inner surface and each said nozzle outer body comprising a central channel configured to removably receive an interchangeable lance, wherein the lance is an oil lance, or a gas diffusion lance, and the lance is received through a corresponding one of said plurality of passages, and wherein the interchangeable lance comprises a lance flange disposed proximate an interchangeable lance upstream end, and wherein the lance flange is bolted into a fixed position with respect to an upstream end of the nozzle block via the lance flange.

9. An adaptable-mode fuel nozzle for a gas turbine engine, said nozzle comprising:
an elongated first sleeve characterized by an upstream end and an opposite downstream end;
a second sleeve disposed radially inward of said first sleeve, said first and second sleeves defining a first fuel passageway there between, said first fuel passageway including an inlet and an exit, said inlet being adapted for fluid communication with a first source of fuel and said exit disposed to provide said fuel to a premix nozzle section disposed radially outwardly of the first sleeve;
a removable and interchangeable lance, said lance being one of a gas lance, and an oil lance, said lance comprising a lance flange proximate an lance upstream end via which the interchangeable lance is bolted to the fuel nozzle proximate the upstream end, the lance disposed radially inward of said second sleeve, said second sleeve and said lance defining a cooling fluid passageway there between, said cooling fluid passageway having an inlet and an exit;

an annular bearing surface disposed about the fuel lance, effective to further define the cooling fluid passageway and to thermally decouple the fuel lance from the second sleeve to allow axial differential thermal growth there between; and a cooling fluid conduit adapted to fluidly connect said cooling fluid passageway with a source of cooling fluid, said conduit having a conduit entrance located upstream of said first fuel passageway exit and a conduit exit in fluid communication with said cooling fluid passageway inlet, whereby said cooling fluid conduit, said cooling fluid passageway, said lance and said first fuel passageway cooperatively ensure that cooling fluid passing through said cooling fluid passageway exit is substantially fuel-free during operation.

10. The adaptable-mode fuel nozzle of claim 9, wherein the first source of fuel is gaseous.

11. The adaptable-mode fuel nozzle of claim 9, wherein the lance is a gas lance, said gas lance additionally defining a central passageway therein, comprising an upstream-end inlet for receiving gas and a downstream-end outlet to provide said gas as a diffusion-type nozzle.

12. The adaptable-mode fuel nozzle of claim 10, wherein the lance is a gas lance, said gas lance additionally defining a central passageway therein, comprising an upstream-end inlet for receiving gas and a downstream-end outlet to provide said gas as a diffusion-type nozzle.

13. The adaptable-mode fuel nozzle of claim 9, wherein the lance is an oil lance, said oil lance additionally defining a central passageway therein, comprising an upstream-end inlet for receiving oil and a downstream-end outlet to provide said oil as a diffusion-type nozzle.

14. A gas turbine engine fuel nozzle comprising:

a gas lance; and a nozzle outer body comprising a premixing section and an interiorly disposed first fuel passageway to supply fuel to said premixing section, and more interiorly a central channel comprising an inlet from an air supply, an aperture at an upstream end to removably receive said gas lance, and a downstream-disposed annular bearing surface adapted to slidingly engage said gas lance, wherein said gas lance, disposed within said central channel, forms a cooling passageway, and wherein said gas lance comprises a lance flange disposed proximate a gas lance upstream end, wherein the gas lance flange removeably affixes the gas lance upstream end to an upstream position fixed with respect to the upstream end of the nozzle outer body, and wherein said gas lance is effective to deliver gaseous fuel.

* * * * *